United States Patent Office

3,256,139
Patented June 14, 1966

3,256,139
PROPIOLATE COMPOSITIONS AND WET STRENGTH PAPER FORMED THEREFROM
George L. Wesp, Ballwin, Mo., assignor to Monsanto Company, a corporation of Delaware
No Drawing. Filed July 1, 1963, Ser. No. 292,138
17 Claims. (Cl. 162—174)

This invention relates to water solubilized propiolates, to polyhydroxy compounds modified with said water solubilized propiolates, to methods for enhancing the usefulness of carbohydrate and proteinaceous coating materials applied to cellulose materials and to methods for increasing the wet rub resistance and wet strength of cellulosic materials.

In copending application S.N. 96,384, filed March 17, 1961 there are disclosed polypropiolate derivatives of polyhydroxy compounds, and methods for making the same, and methods for using those derivatives impregnating and coating agents for imparting wet strength and wet rub resistance to cellulosic materials such as paper, starch, polyvinyl alcohols etc. The subject matter of that case involves the cross-linking of the polyhydroxy compounds with the polypropiolate in the presence of an amine catalyst and in an organic solution such as acetone or an aqueous emulsion necessitating the use of an emulsifying agent. However, to the paper maker, solvents are undesirable in paper treatment because of costs and hazards, and emulsifying agents have deleterious effects on fiber-fiber bonding and add to the cost of producing the paper. It is therefore desirable to find compositions and methods for improving various characteristics of the polysaccharide substrate such as cellulose, starch, without substantially increasing the hazards or the cost of the process.

This invention provides methods for rendering the propiolates water soluble so that they may be used in treating cellulosic materials in the water phase without the necessity of using emulsifying agents, organic solvents, or amine catalysts. It has been found that according to this invention that a high degree of wet strength can be achieved by impregnation of already formed paper with water solubilized propiolates. It has also been found that certain normally water insoluble dipropiolates can be solubilized so that they may be used by themselves or with starch or casein or other carbohydrates or protein aceous additives to achieve wet strength in paper. These solubilized dipropiolates in the presence of dissolved starch form an effective wet end additive in pulp furnishes adjusted to pH's of around 7. This invention also provides a method for solubilizing and using polypropiolates to modify polysaccharide compounds without the necessity of using a basic amine catalyst.

This invention provides a method for improving the wet strength of cellulosic materials such as paper products and wet rub resistance thereof by impregnating the paper or coating the paper with the composition containing the polypropiolate. However, it is more common to apply the wet strength additive to paper products by the addition of the additive to the pulp furnish in the wet end of the paper making process. The compositions of this invention are especially useful for additives to starch or casein based coatings for paper and also as additives with starch and casein in the wet end method for making paper products having improved wet strength and wet rub resistance.

Briefly, according to this invention it has been found that polypropiolate esters can be made soluble in water by the addition thereto of a weak alkali metal or alkaline earth metal basic salt such as sodium bicarbonate, potassium bicarbonate, sodium carbonate, potassium carbonate, calcium carbonate, etc. The basic salt is usually added in proportions equivalent to 0.5 to 3.0 equivalent of the salt per propiolate ester group in the propiolate compounds. The aqueous solutions of these combinations in water provide compositions which have good wet strength improving properties by themselves when added to paper either by coating, impregnation, or by adding them to the aqueous pulp suspensions, but are especially useful when combined with protein or carbohydrate materials such as casein, or starch materials conventionally used in wet end paper treating methods. I have found that with these weakly basic salts the polypropiolates can be solubilized in water without presence of an organic solvent or without the necessity of using an organic amine catalyst for the reaction between the propiolate and the polyhydroxy compound. I have found however, that strong bases such as sodium hydroxide, potassium hydroxide, calcium hydroxide, etc. are not desired for the purposes of this invention because they tend to saponify the polypropiolate esters and to reduce the amount of wet strength obtainable for given quantity of the polypropiolate ester. However, where some sacrifice can be made in wet strength of the paper it is within the scope of the invention to use the stronger base to raise the pH of the mixture to say, 5.5 to 6 and then to add the weak basic salt preferably, sodium bicarbonate, to raise the pH of the mixture to around 7 to 7.5 preferably to about 7.1 to about 7.2 before it is applied to the paper either as an impregnate therefor or as a wet end additive.

The terms "propiolate" and "polypropiolates" are used in this specification to refer generally to the di-, tri-, and tetrapropiolate esters of certain di-, tri-, tetrahydroxy group containing compounds and mixtures thereof.

The propiolate esters (component A) useful for the purposes of this invention may be described generically by the following general formula

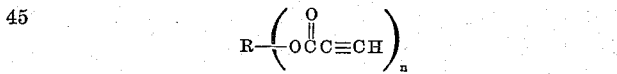

wherein R is a bi-, tri-, or tetravalent group or radical selected from the group consisting of:

(a) ethylene, glyceryl, pentaerythrityl, (b) ethyleneoxyethylene and polyethyleneoxyethylene radicals having a total of from 1 to about 10 oxygen atoms, and a total of from 2 to about 11 ethylene groups, (c) glyceryl-ethylene, ethyleneoxyethylene, and polyethyleneoxyethylene ether groups having a total of from 3 to about 10 oxygen atoms and a total of 1 to about 11 ethylene groups, and (d) pentaerythrityl-ethylene, ethylene oxyethylene, and polyethyleneoxyethylene ether radicals having from 4 to about 10 oxygen atoms and a total of from 1 to about 11 ethylene groups said R being bonded through different carbon atoms thereof to the remainder of the molecule of which it forms a part, and n is an average number of from 2 to 4, and corresponds to the number of hydroxyl groups of the R moiety which have been esterified with propiolic acid.

(B) An inorganic salt selected from the group consisting of the bicarbonates and carbonates of the alkali metals and alkaline earth metals, including magnesium; the proportions of ingredients (A) and (B) being in the chemical equivalent ratio of at least about 0.5 to about 3 equivalents of bicarbonate to each equivalent of the propiolate ester moiety.

The higher molecular weight materials of component (A) are for the most part water soluble per se while those of lower molecular weight are not water soluble. In these compositions, component (B) serves the function of rendering component (A) water soluble, as well as to neutralize any acidity imparted to the solution by the polypropiolate component (A). Thus, in this specification and claims, the term "solubilized propiolate" refers to di-, tri- and tetrapropiolates which are rendered water soluble in combination with one of the alkali metal or alkaline earth metal bicarbonates or carbonates.

As stated above these solubilized polypropiolate compositions are especially adapted to be used with carbohydrate and proteinaceous materials normally used by the paper maker for enhancing the properties of cellulose pulp derived paper. These compositions are compatible with the amounts of acid salts, normally referred to as alum, used in the formation of paper. The compositions of this invention, when used as a wet end additive to paper, reduce the requirement for some of the alum which would be used in the absence of the solubilized polypropiolate. In some instances the use of alum can be eliminated. When alum is used in treating the aqueous pulp in combination with the compositions of this invention, reduced amounts of alum are generally necessary. When alum is used, however, it is generally desirable to use a greater amount of the weak basic salt, i.e., the alkali metal or alkaline earth metal bicarbonate or carbonate to keep the pH of the treated pulp suspension close to about pH 7–7.5 at the time of sheet formation.

The solubilized polypropiolate compositions of this invention may be used in combination with any of the various forms of carbohydrate materials normally used by the paper maker. Examples of various carbohydrates with which these compositions are compatible include the lower saccharides such as sucrose, dextrose, dl-glucose, fructose, galactose, arabinose, xylose, as well as the polysaccharides such as starches, cellulose, hydroxy-bearing cellulose ester, ethers, or xanthates, and the natural carbohydrate gums such as tragacanth, guar gum, locust bean gum, carrageenin, gum arabic, agar, pectin, ghatti, karaya, algin, etc. Of this class it is preferred, for paper treating purposes, to combine the solubilizable polypropiolates with the natural starches, such as unmodified corn and tapioca starches, the water soluble starches such as hydroxyethylated starch, and the cationic starches such as amino group containing starches.

The solubilized polypropiolates of this invention are also useful for modifying the properties of high molecular weight hydroxy containing synthetic polymers such as polyvinyl alcohol, partially hydrolyzed polyvinyl carboxylates such as polyvinyl acetates or polyvinyl formate, partially hydrolyzed copolymers of vinyl carboxylates and copolymerizable compounds such as vinyl acetate-vinyl chloride copolymer or vinyl acetate-ethylene copolymer, partially acetalized polyvinyl alcohol such as polyvinyl formal or polyvinyl butyral containing some hydroxy radicals, polyvinyloxyethanol or copolymers of vinyloxyethanol and a compound copolymerizable therewith such as vinyloxyethanol-propylene copolymer, etc.

These solubilizable polypropiolates may be used in combination with various animal and vegetable proteinaceous materials used to treat paper materials. Among such materials are soya protein, bone glue, zein, egg albumin, casein, blood albumin, gelatin, gluten, peanut proteins, etc. Other proteins which can be used include the albumins such as egg albumin, blood albumin, lactalbumin, and leucosin, the glutelins such as glutenin (from wheat) and oryzenin (from rice) prolamins or gliadins such as gliadin (from wheat), hordein (from barely), the histones such as globin (from hemoglobin), etc.

It is preferred to use the alkali metal bicarbonates and carbonates rather than the alkaline earth metal salts. As a practical matter, for commercial reasons, it is preferred to use the sodium or potassium bicarbonates or carbonates, although the other alkali metal salts may be used. Especially preferred is sodium bicarbonate and it is preferred over sodium carbonate since it has been found that use of sodium carbonate results in a reduction in the level of wet strength obtained in the resulting treated paper.

The water solubilized polypropiolate composition when applied in combination with a carbohydrate such as starch, or protein, e.g. casein in aqueous medium to paper, either as a coating or impregnating agent or as a wet end additive to the aqueous pulp suspension used in making paper serves to cross-link the starch or casein, and to cross-link it with the cellulose hydroxyl groups of the cellulose pulp fiber, thus providing a substantive wet strength to the paper which cannot be removed by extraction with water or organic solvents.

The compositions of this invention, either alone, or in combination with carbohydrate and proteinaceous coating and adhesive agents, are preferably applied to the paper in aqueous medium having a pH close to neutrality, i.e., pH 7, and preferably at pH's slightly above this point, although the compositions may be applied at pH's below this point with some sacrifice in potential wet strength and wet-rub resistance for the given amount of the composition added. These compositions may be applied as aqueous pastes to the cellulose substrate but in paper treatment it is preferred to apply them in dilute aqueous concentrations in the aqueous pulp suspensions used to form the paper, commonly called the "wet end" method of application. In such applications the compositions may be dissolved to the extent of from about 0.1% to about 5%, based upon the weight of the dry pulp in the suspension, of the polypropiolate ester. The amount of the alkali metal or alkaline earth metal bicarbonate or carbonate used may be added admixed with the polypropiolate ester, or independently thereof, but is always added at least in sufficient amount to be within 0.5 to 3.0 chemical equivalents of bicarbonate ion per chemical equivalent of the propiolate ester moiety. This amount is oftentimes sufficient to impart the desired pH of at least 7 to the aqueous pulp suspension, but the amount necessary for such purpose generally depends upon other factors such as the type of pulp used, and on whether acid ingredients, such as alum are also used. In such cases, it is usually desirable to add excess bicarbonate or carbonate salt sufficient to raise the pH of the aqueous suspension to between at least 7.0 and 7.5, preferably 7.1 to 7.2, before the pulp is used to form paper therefrom.

The following exemplifies how the polypropiolates used as component (A) of the composition of this invention may be prepared.

Ethylene glycol dipropiolate was prepared by stirring and refluxing a mixture of 12.4 g. of ethylene glycol, 30.8 g. of propiolic acid, 5 drops of sulfuric acid and 100 ml. of benzene for 5.5 hours, during which time 7.1 ml. of water by-product was collected (98.5% of theory for diesterification), cooling the mixture, and neutralizing it by adding 0.7 g. of sodium carbonate thereto. After standing overnight the reaction mixture was filtered to separate solids, and the filtrate was concentrated under vacuum to give 32.8 g. of pale yellow oil. The oil was distilled to give substantially pure ethylene dipropiolate, B.P. 90–92° C./1.3 mm., $n_D^{25}$ 1.5618, which analyzed as containing 57.56% carbon and 3.85% hydrogen as against 57.83% carbon and 3.64% hydrogen, the calculated values.

The dipropiolates of tetraethylene glycol, and polyethyleneoxyethylene glycols having molecular weights ranging about 300, 400, and 600 were prepared as follows:

To 0.20 mole of tetraethylene glycol there was added 0.42 mole of propiolic acid, 1.0 g. of p-toluenesulfonic acid, and benzene as a solvent. The mixture was refluxed for 14.5 hours during which time 7.0 ml. of water by-product was collected. The reaction mixture was neutralized with lime and concentrated. In another preparation the reaction mixture was neutralized with a mixture of sodium bicarbonate and calcium oxide, filtered, and concentrated to obtain tetraethylene glycol dipropiouate in 98% yield, $n_D^{25}$ 1.4742, molecular weight (benzene) found was 339 by the freezing point method as compared with a theory of 298. The product was soluble in water only to an extent of less than 1%.

To 0.1 mole of each of polyethyleneoxyethylene glycols having molecular weights of about 300, 400, and 600 there was added 0.206, 0.22, and 0.22 moles of propiolic acid respectively and 1.0 g. of p-toluenesulfonic acid using benzene as solvent. The respective reaction mixtures were refluxed for 7.1, 17, and 22 hours respectively, during which time 4.0, 3.9, and 3.6 ml. respectively of water was collected. The reaction mixtures were neutralized with calcium oxide, filtered and concentrated as above to obtain 87%, 89%, and 93% yields respectively of the polyethyleneoxyethylene glycol dipropiolates. These compounds had the following physical characteristics:

| Dipropiolate | $H_2O$ Soly., percent w./w. | F.P. mol. wt. (dioxane) | $n_D^{25}$ |
|---|---|---|---|
| PEG[1] 300 | 1.3 | [2] 421 (404) | 1.4749 |
| PEG 400 | 6.3 | 523 (504) | 1.4751 |
| PEG 600 | ∞ | 709 (704) | 1.4748 |

[1] PEG=polyethyleneoxyethylene glycol having about the molecular weight of the number given.
[2] Theory for diester.

$H_2O$ Soly.=solubility in water at room temperature.
F.P. Mol. wt. = freezing point method of determining molecular (dioxane) weight using dioxane as a solvent.

The above products are of too high a molecular weight to be distilled without decomposition so the products were isolated by stirring 10% solids benzene solutions or dispersions with powdered calcium oxide until the solutions, after filtration, tested neutral to moist alkacid and litmus papers. The solutions were then decolorized with carbon black and taken to dryness with water pump vacuum in a rotating 500 ml. flask heated with a 90° C. water bath, finally pumping at about 0.1 mm. of mercury pressure with a Welsh Duoseal pump for about 30 minutes. The yields indicated were calculated from the final dry weights.

Water solubilities were determined by shaking 0.5 g. of the dipropiolate in a 4 oz. French Square bottle with increased amounts of water until a clear solution was visually noted.

The invention is further exemplified by the following detailed examples of the preparation, and use of the compositions of this invention, but it is not intended that the invention be limited thereto.

*Example 1*

To a mixture of .00301 mole of ethylene dipropiolate in 50 ml. of water, there were added the following basic salts in the indicated molar amounts to provide approximately 1 equivaleint of basic salt per equivalent ester group.

Base:                                   Amount (mole)
$Na_2CO_3$ _____ .00301
$NaHCO_3$ _____ .00602

Another group of solutions were prepared by mixing .00301 mole of ethylene dipropiolate, .00301 mole of sodium carbonate or .00602 mole of sodium bicarbonate and 0.5% of casein in the solution. Each solution was checked for pH and qualitative wet strength on filter paper after aging 1.2, 1.6 hours, and 92 hours. The results were as follows:

| EDP solubilized with— | 1.2, 1.6 hr. | | 24 hr. | | 92 hr. | |
|---|---|---|---|---|---|---|
| | pH | W.S. | pH | W.S. | pH | W.S. |
| $Na_2CO_3$ | 7.97 | Fair | 7.29 | Fair | 7.10 | Fair. |
| $Na_2CO_3$ plus casein | 7.87 | Good | 7.28 | Good | 7.08 | Good. |
| $NaHCO_3$ | 7.71 | do | 7.28 | do | 7.05 | Do. |
| $NaHCO_3$ plus casein | 7.66 | do | 7.26 | do | 7.00 | Do. |

The above wet strengths of basic salt solubilized ethylene glycol dipropiolate treated paper were observed with Whatman No. 1 filter paper strips cured for 15 minutes in an oven at 105° C. Impregnated papers dried and aged four days at room temperature were almost as poor in wet strength as untreated paper except for the $NaHCO_3$:casein:EDP treated paper which was rated fair.

*Example 2*

This example compares the relative effect on wet strength and color of cellulose paper impregnated with propiolate esters solubilized with various basic salts.

For this comparison, 50 ml. portions of 0.5% aqueous ethylene dipropiolate dispersions were mixed with one equivalent per ester group of the following inorganic compounds. Each mixture was shaken 24 hours at room temperature, and then used to impregnate strips of Whatman No. 1 filter paper which were oven dried for 15 minutes at 105° C. The results are summarized in the following table:

| Compound | Solution | | Paper Wet strength | Color |
|---|---|---|---|---|
| | Nature | pH | | |
| $NaHCO_3$ | Clear | 7.15 | V. good | Ft. yellow.[1] |
| Na acetate | Droplets | 6.10 | Good | Tan. |
| $NaHPO_4$ | Clear | 7.22 | Fair | Lt. yellow. |
| $NH_4HCO_3$ | Sl. milky | 7.20 | Poor | None. |
| $(NH_4)_2CO_3$ | Clear | 7.20 | do | Do. |
| $Na_4B_2O_4$ | do | 7.70 | do | Do. |
| $Mg(OH)_2$ | Sl. milky | 9.30 | do | Do. |
| NaSH | Ppt | 9.64 | do | Ft. yellow. |
| $Na_2SO_3$ | Clear | 7.12 | do | None. |
| $Na_2S_2O_3$ | do | 3.13 | do | Do. |
| $Na_2S_2O_5$ | do | 6.24 | do | Do. |

[1] Ft. stands for faint.

None of various salts and bases were as effective as sodium bicarbonate on wet strength improvement, although ethylene dipropiolate solubilization and comparable basicity were noted in a number of instances.

*Example 3*

This example illustrates the effect on wet strength characteristics of paper impregnated with alkali metal bicarbonate solubilized propiolate ester solutions with various cure times and temperatures, bicarbonate:propiolate ester stoichiometric ratios, and solution age.

To aqueous dispersions containing .00301 mole of ethylene dipropiolate per 100 ml. of water, there was added various amounts of sodium bicarbonate. At various times the pH of the resulting solutions were noted and used to impregnate Whatman No. 1 filter paper strips. The impregnated papers were cured for 5–15 minutes in an oven at 80° C., or 105° C., and papers so impregnated were then subjected to tensile strength tests in the dry and wet conditions to determine the effect of the impregnations, age time, and cure conditions. The results are summarized as follows:

| Amt. of NaHCO₃ (moles) | Age pH/hr. | Cure Min. | Cure °C. | Tensile Tests Dry lb./in.² | Tensile Tests Wet lb./in.² | Percent WS Retention [1] |
|---|---|---|---|---|---|---|
| .00301 | 7.49/1.5 | 15 | 105 | 8.04 | 3.96 | 36 |
| .00301 | 6.83/24 | 15 | 105 | 8.72 | 3.41 | 31 |
| .00542 | 7.54/1.5 | 15 | 105 | 7.27 | 3.15 | 29 |
| .00542 | 7.00/24 | 15 | 105 | 7.53 | 3.01 | 28 |
| .00602 | 7.56/1.1 | 15 | 105 | 9.05 | 2.42 | 22 |
| .00602 | 7.56/1.1 | 15 | 105 | 6.94 | 2.43 | 22 |
| .00602 | 7.56/1.1 | 15 | 105 | 8.63 | 3.13 | 29 |
| .00602 | 7.50/2.1 | 5 | 80 | 7.20 | 2.30 | 21 |
| .00602 | 7.50/2.1 | 10 | 80 | 7.41 | 2.65 | 24 |
| .00602 | 7.50/2.1 | 15 | 80 | 7.65 | 2.66 | 24 |
| .00602 | 7.00/24 | 15 | 80 | 7.37 | 2.60 | 24 |
| (²) | 7.56/1.1 | 10 | 105 | 11.33 | 5.18 | 48 |
| (²) | 7.56/1.1 | 10 | 80 | 9.48 | 3.80 | 35 |
| .00663 | 7.60/1.5 | 15 | 105 | 8.64 | 3.41 | 31 |
| .00663 | 7.11/24 | 15 | 105 | 8.65 | 3.21 | 29 |
| .00903 | 7.64/1.5 | 15 | 105 | 8.23 | 3.22 | 29 |
| .00903 | 7.20/24 | 15 | 105 | 8.21 | 2.56 | 24 |
| ³.00602 | 7.56/1.1 | | | 6.97 | 1.70 | 16 |
| No. 1 Control (H₂O dip only) | | 15 | 105 | 7.53 | 0.35 | 3.2 |
| No. 2 Control | (Not wetted or heated) | | | 10.90 | 0.30 | 2.8 |

[1] Basis dry strength of untreated paper (No. 2 Control).
[2] The wet papers were air dried for 60 minutes at 25° C before oven treatment.
[3] The wet paper was allowed to stand in air for 22 days at 25° C. and no oven treatment was used.

With oven curing of the wet paper, maximum wet strengths (about 4.0 lb./sq. in.) at 0.5% ethylene dipropiolate were obtained with one equivalent of sodium bicarbonate per mole of ethylene dipropiolate aged about 1.5 hour. Aging of this solution for 24 hours decreased the wet strength to 3.4 lb./sq. in. Higher sodium bicarbonate:ethylene dipropriolate ratios (1.8, 2.0, 2.2, 3.0) gave wet strengths of about 3.2 lb./sq. in. with solutions aged 1–2 hours under like wet cure conditions (15 minutes at 105° C.). Aging of these solutions for 24 hours caused a further drop in wet strength to 2.5–3.0 lb./sq. in. These wet strengths correspond to wet strength retentions in the range of 30 to 50%. Decreasing the 15 minute cure temperature to 80° C., with 2:1 sodium bicarbonate:ethylene dipropiolate molar ratios, decreased wet strength to about 2.6 lb./sq. in. irrespective of solution aging. Where no oven curing was used the treated papers, which were allowed to stand for 22 days before testing, gave wet strength retentions of only 1.7 lb./in., but this is still much higher than the control at 0.35 lb./in.

Cure times at 80° C. and 105° C. with a 2:1 molar ratio of NaHCO₃ to ethylene dipropriolate were varied from 5–15 minutes in a forced air oven. Wet strengths increased from about 2.4 lb./sq. in. for 5 minutes at both temperatures to about 3.1 lb./sq. in. for a 105° C. cure and to about 2.7 lb./sq. in. for an 80° C. cure for 15 minutes. These data are for 1–2 hour aged solutions. Aging the solutions for 24 hours decreased wet strength to the level of the 80° C. cures which did not change significantly with aging.

*Example 4*

This example compares the effect of alkali metal bicarbonate, and hydroxide solubilized propiolate ester paper treatments on wet and dry tensile strength, with and without other paper treatment additives.

For this example, ethylene dipropiolate dispersions containing .0030 mole of the ester per 100 ml. of water were solubilized by adding the following alkali metal compounds in the indicated amounts

| Compound: | Amount (mole) |
|---|---|
| Na₂CO₃ | 0.0030 |
| NaHCO₃ | 0.0060 |
| NaOH | 0.00125 |

To portions of each of the sodium carbonate and sodium bicarbonate and sodium hydroxide solubilized ethylene dipropiolate solution there was added 0.5% by weight of casein. Each solution was aged for 3 hours, impregnated into Whatman No. 1 chromatographic filter paper tape and then the treated papers were cured in forced air oven for 15 minutes at 105° C.

Some of the NaOH:EDP:casein treated paper was dried for 75 minutes at room temperature before heating it in an oven as above.

The above wet strength additive compositions were also compared with the wet strength imparted by a commercial material, "Herculese Kymene-577" at 1% concentration with pH adjusted to 6, 8, and 10 when used to impregnated Whatman No. 1 chromatographic tape and cured 15 to 30 minutes at 105° C. This commercial product, which is a water soluble quaternary derived from a basic polyamide+epichlorohydrin, is one of the few commercial wet strength additives curable under neutral or alkaline conditions. The tensile strength in lb./sq. in. for the various additives are summarized below:

| | Tensile strength lb./sq. in. Wet | Tensile strength lb./sq. in. Dry | Percent W.S. Retention [1] |
|---|---|---|---|
| Paper Treated With: | | | |
| NaHCO₃:EDP:Casein | 4.60 | 10.9 | 42 |
| NaHCO₃:EDP | 3.66 | 8.3 | 44 |
| Na₂CO₃:EDP:Casein | 3.60 | 10.0 | 36 |
| Na₂CO₃:EDP | 2.70 | 7.7 | 35 |
| NaOH:EDP:Casein | 2.40 | 9.6 | 25 |
| NaOH:EDP:Casein (air dired) | 3.4 | 10.0 | 34 |
| NaOH:Casein | 0.3 | 9.7 | 3 |
| NaOH | 0.20 | 7.0 | 3 |
| Untreated | 0.30 | 10.9 | 3 |
| 1% Kymene-557 at pH: | | | |
| 6 | 3.1 | 10.3 | 30 |
| 8 | 2.0 | 9.0 | 22 |
| 10 | 3.0 | 9.4 | 32 |

[1] Basis corresponding dry strength.

In summary, the controls, untreated, caustic (NaOH) only, and caustic plus casein had no wet strength, but the casein restored dry strength to near the level of the untreated paper. The propiolate treatments all showed wet strength and the casein propiolate combinations were even more effective. In these runs the propiolate concentration was constant at 0.5%, on the basis of the water.

The results also show that the wet strengths of paper treated with the commercial product range from 2–3.6 lb./sq. in. when applied at 1% concentration at pH 6, 8, 10. This product at 1% concentration is less effective than the best dipropiolate compositions at 0.5% concentrations.

*Example 5*

This example illustrates the use of a bicarbonate solubilized propiolate ester as a starch modifier for coating paper to improve the wet rub and wet strength of the treated paper.

A 48 hour aged solution of 0.5 g. (0.00301 mole) of ethylene dipropiolate (EDP) in 100 ml. of water plus 0.00602 mole of $NaHCO_3$ was prepared and 25 ml. portions of that solution were mixed with 2.5 g. of (a) unmodified corn starch or (b) ACS soluble starch (corn starch degraded so that it is soluble in cold water ACS—American Chemical Society specification). The mixtures were heated with rapid stirring to a boil and then cooled at once. Films of each composition (a) and (b) dried at 105° C. for 15 minutes were insoluble in boiling water. Whatman No. 1 filter paper was coated on one side with the viscous corn starch paste (a) by doctoring with a glass rod. After a 15 minute 105° C. cure followed by a 1 hour soak in water, the paper had good wet strength and the slippery wet out starch coating could not be rubbed off with the fingers. The A.C.S. starch solution (b) was fluid enough for coating paper by dipping the paper into the solution. After a like cure this paper also developed wet strength and wet rub resistance.

For another test, a 25 g. portion of a boiled cooled 20% solids unmodified corn starch paste was diluted with 25 ml. of a 0.5% ethylene dipropiolate solubilized with two equivalents of sodium bicarbonate. This solution also gave good wet strength and wet rub resistance when coated and cured on filter paper.

These tests show that as little as 5% of bicarbonate solubilized propiolate ester, based on the amount of starch used, is effective in conferring wet rub resistance and wet strength properties to starch coated paper.

*Example 6*

Hydroxyethylated starches are often used in paper coating because of superior application and performance characteristics, since they are more reactive than unmodified starch. The following paragraph shows that hydroxyethylated starch can be cross-linked by bicarbonate solubilized propiolate esters in aqueous solution.

A smooth clear solution of a commercially available hydroxyethylated starch ("Starfilm T") was obtained by dispersing 5 g. of the starch in a 48 hour aged solution of 0.250 g. ethylene dipropiolate plus 0.253 g. of $NaHCO_3$ plus 50 ml. of water and heating rapidly to a boil and cooling at once.

This solution brushed on one side of Whatman No. 1 filter paper and dried for 15 minutes at 105° C. gave good wet strength.

*Example 7*

This example illustrates the use of the bicarbonate solubilized propiolate esters being used as a "wet end" wet strength improving additive to cellulose pulp which is then formed into paper.

For this purpose, a stock solution was prepared by mixing 6.67 g. of 30% hydroxyethylated starch, "Starfilm T" dissolved in water at 90°–95° C. and cooled, 1.00 g. of ethylene dipropiolate, 1.114 g. of $NaHCO_3$, and 12 ml. of water. The mixture was stirred for 1.3 hours at room temperature and then diluted with 79.2 ml. of water (total of 91.2 ml. of water) and stirring was continued. The solution pH changed from 7.55 at 4.6 hour age with stirring to 6.95 at 22 hours. The solution was 28 hours old when used. The solution contained 1% ethylene dipropiolate and 2% starch.

An aqueous pulp was prepared as follows:

Nashua P-3 electrical marking paper (additive free), 18.9 g., was torn into ¾" squares, soaked 0.5 hour in 450 ml. of $H_2O$, and disintegrated in a Waring Blendor for 18 minutes while gradually increasing the speed of the Blendor at 1, 2, 3, 8, and 12 minute times. Additional 100 ml. portions of water were added to the disintegrating paper pulp after 3 and 8 minutes of stirring. The resulting furnish was then deaerated in a 2 liter suction flask for 5 minutes and diluted to 900 g. total weight to give a 2% consistency furnish.

Two 100 g. portions of the above 2% Nashua P-3 pulp furnish were each diluted with 900 ml. of distilled water and then treated with 2 ml. and 4 ml. portions of the above stock solution to get 1% and 2% of ethylene dipropiolate, respectively, on the fiber. The furnishes were then hand stirred with a glass rod while adding 1% $Al_2(SO_4)_3$ (alum) solution to each solution to equal 5% by weight (pulp basis) and adjusted to pH 7.2 with 4% $NaHCO_3$ using a pH meter and glass electrodes. The furnish+additive mixtures required 28 ml. and 26 ml. respectively of 4% $NaHCO_3$ for the 1% and 2% ethylene dipropiolate furnishes.

After allowing the neutralized furnish to stand for one hour handsheets were made therefrom, the handsheets were placed between double thicknesses of Whatman No. 1 filter paper, pressed on a hydraulic press at 50 p.s.i.g. for 3 minutes, and hung to dry in a forced air oven for 15 minutes at 105° C.

The handsheets were then tested for wet and dry tensile strength. The results were as follows:

| Additive to Furnish | Final pH of furnish | Tensile Tests | | |
|---|---|---|---|---|
| | | Dry lb./ sq. in. | Wet lb./ sq. in. | Percent W.S. Retention |
| 1% EDP plus 2% starch (fiber basis) | 7.2 | 14.5 | 4.46 | 31 |
| 2% EDP plus 4% starch (fiber basis) | 7.2 | 15.8 | 6.36 | 40 |
| Control (No additive to furnish) | 5.0 | 12.9 | 0.64 | 5 |
| Starch, 4% and alum 5% | | 15.0 | 1.04 | 7 |

The above results show that when bicarbonate solubilized propiolate esters are combined with the starch for addition to the pulp furnish there is obtained about a 6 fold improvement in the wet strength of the resulting paper when the dipropiolate is solubilized with about 2 equivalents of $NaHCO_3$ in an aqueous starch stock solution.

In other tests it has been found that over the range of 0.5 to 2% of the dipropiolate ester on the fiber, wet strength retentions of the order of 20 to 40% are developed.

The type of starch used is not critical but hydroxyethylated tapioca starch gave somewhat higher wet strengths than others such as raw corn starch.

The starch:propiolate:$NaHCO_3$ solutions may be aged for from 2 to 96 hours at room temperature with little change in activity as judged by wet strength retentions.

The alum may be added before or after the starch:propiolate:$NaHCO_3$ solution.

The treated furnish may be aged 0.5 to at least 1.5 hours before sheet formation and as either a 2% or 0.2% furnish.

*Example 8*

This example illustrates the fact that the use of a bicarbonate solubilized dipropiolate ester together with a cationic starch results in the formation of a substantive complex for cellulose pulp treatment in a "wet end" addition step, and minimizes or eliminates the need for alum to secure retention of the additive on the resulting paper.

Stock solutions of ethylene dipropiolate, sodium bicarbonate, and cationic starch were made by combining 0.50 g. of ethylene dipropiolate, 0.5108 g. of NaHCO₃, and either (a) 50 g. of a 2% solids solution of the cationic starch ("Cato-8") which had been stirred at 95°–100° C. for 5 minutes and cooled (pH 3.9) or (b) 25 g. of the 2% starch solution and 25 g. of water. The solutions were mechanically shaken in sealed 4 oz. French Square bottles at room temperature. After 19 hours, solution (a) had a pH of 7.1; after 23 hours solution (b) had a pH of 6.9.

Appropriate 2 ml. aliquots of each stock solution (a) and (b) were then added to 200 g. furnishes of 1% fiber content to supply either 1% ethylene dipropiolate plus 1% cationic starch or 1% ethylene dipropiolate plus 2% cationic starch. To some furnishes alum was added as a 1% solution, pH adjustments to about 7.1–7.2 were made with NaHCO₃ and the furnishes were aged 1 hour before dilution to 0.2% fiber and final pH adjustment with NaHCO₃ or with HCl to pH 7.1.

The results are summarized in the following table:

| No. | Fiber Basis, Percent | | | 1% Furnish | | Addition Kind [3] | Ml. | pH Change | Wet strength lb./in.² |
| --- | --- | --- | --- | --- | --- | --- | --- | --- | --- |
| | Starch [1] | EDP [2] | Alum | Ml. NaHCO³ | pH Change | | | | |
| 1 | 2 | 1 | | | 6.5 | | | 6.58 | 2.72 |
| 2 | 2 | 1 | | 1.15 | 6.5–7.2 | NaHCO³ | 1 | 6.82–7.1 | 3.71 |
| 3 | 2 | 1 | 1 | 4.85 | 4.48–7.12 | NaHCO³ | 0.1 | 7.08–7.1 | 3.99 |
| 4 | 2 | 1 | 3 | 11.90 | 4.13–7.2 | HCL | (⁴) | 7.2–7.1 | 3.62 |
| 5 | 2 | 1 | 3 | 2.85 | 4.13–6.15 | HCL | (⁴) | 6.18–6.0 | 3.01 |
| 6 | 2 | 1 | 5 | 15.45 | 4.05–7.15 | HCL | (⁴) | 7.16–7.1 | 3.71 |
| 7 | 2 | | | 1.2 | 4.85–7.2 | NaHCO³ | 0.75 | 6.9–7.1 | 0.57 |
| 8 | 1 | 1 | | 0.9 | 6.5–7.15 | NaHCO³ | 0.85 | 6.9–7.1 | 2.80 |
| 9 | 1 | 1 | 1 | 3.3 | 4.52–7.1 | HCL | (⁴) | 7.18–7.1 | 2.12 |

[1] Starch is "Cato 8" cationic starch.
[2] EDP is ethylene dipropiolate.
[3] NaHCO³ was 4%; HCl was 10%, 1–3 drops as needed.
[4] Drop.

These results show that appreciable wet strength was obtained without the use of alum and the sodium bicarbonate requirement was much less than when alum was present (Runs 2 and 8). A small amount of alum may be necessary to obtain maximum wet strength (compare Nos. 2 and 3).

What is claimed is:

1. A composition of matter comprising (A) a propiolic acid ester of the formula

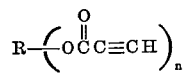

wherein R denotes a radical having from 2 to 4 valences and is selected from the group consisting of
 (a) ethylene, glyceryl, pentaerythrityl,
 (b) ethyleneoxyethylene, and polyethyleneoxyethylene ether groups having a total of 1 to about 10 oxygen atoms, and a total of from 2 to about 11 ethylene groups,
 (c) glyceryl-ethylene, ethyleneoxyethylene, and polyethyleneoxyethylene ether groups having a total of from 3 to about 10 oxygen atoms, and a total of from 1 to about 11 ethylene groups, and
 (d) pentaerythrityl-ethylene, ethyleneoxyethylene, and polyethyleneoxyethylene ether groups having from 4 to about 10 oxgen atoms and a total of from 1 to about 11 ethylene groups,
said R being bonded through different carbon atoms thereof to the remainder of the molecule of which it forms a part; and n is an average number of from 2 to 4, and corresponds to the number of hydroxyl groups of the R moiety which have been esterified with propiolic acid; and (B) an inorganic salt selected from the group consisting of the bicarbonates and carbonates of the alkali metals and alkaline earth metals; the proportions of said components (A) and (B) being in the chemical equivalent ratio of about 0.5 to about 3.0 equivalents bicarbonate ion to each equivalent of propiolic acid ester moiety.

2. A composition as described in claim 1 in combination with at least an equal amount by weight of a polysaccharide, based on the polypropiolate ester-salt composition, and up to 20 parts by weight thereof per part by weight of the polypropiolate ester.

3. A composition as described in claim 2 in which the polysaccharide is starch.

4. A composition as described in claim 3 wherein the starch is a cationic starch.

5. A composition as described in claim 1 in combination with at least an equal amount by weight of a protein, based on the polypropiolate ester-salt composition, and up to 20 parts by weight thereof per part by weight of the polypropriolate ester.

6. A composition as described in claim 5 wherein the protein is casein.

7. A composition as described in claim 1 wherein the propiolic acid ester (A) is ethylene dipropiolate and the inorganic salt (B) is sodium bicarbonate.

8. A composition as described in claim 1 wherein the propiolic acid ester (A) is a polyethylene glycol dipropiolate wherein the polyethylene glycol moiety of the ester has a molecular weight of from about 200 to about 600, and the inorganic salt (B) is sodium bicarbonate.

9. A composition as described in claim 7 in combination with at least an equal amount by weight of starch, based on the polypropiolate ester-salt composition, and up to 20 parts by weight thereof per part by weight of the polypropiolate ester.

10. A composition as described in claim 7 in combination with at least an equal amount by weight of casein, based on the polypropiolate ester-salt composition, and up to 20 parts by weight thereof per part by weight of the polypropiolate ester.

11. A paper product derived from cellulose pulp which has been treated with a minor amount of from about 0.1 to about 5 weight percent of a composition described in claim 1.

12. A paper product derived from cellulose pulp which has been treated with a minor amount of from about 0.1 to about 5 weight percent of a composition described in claim 7.

13. A paper product derived from cellulose pulp which has been treated with a minor amount of from about 0.1 to about 5 weight percent of a composition described in claim 9.

14. A paper product derived from cellulose pulp which has been treated with a minor amount of from about 0.1 to about 5 weight percent of a composition described in claim 10.

15. A method for improving the wet tensile strength of cellulose paper which comprises treating the paper with a minor amount of from about 0.1 to about 5 weight percent of the ingredients of the composition described in claim 1, and then curing the thus treated paper.

16. A method for improving the wet tensile strength of cellulosic paper which comprises adding to the aqueous pulp which is to be used in making said paper a minor amount of from about 0.1 to about 5 weight percent, based on the dry weight of the pulp, of the ingredients of the composition described in claim 1 and then forming paper from the resulting pulp composition.

17. A method for improving the wet tensile strength of cellulosic paper which comprises adding to the aqueous pulp which is to be used in making said paper a minor amount of from about 0.1 to about 5 weight percent, based on the dry weight of the pulp, of the ingredients of the composition described in claim 7, and then forming paper from the resulting pulp composition.

References Cited by the Examiner

UNITED STATES PATENTS

| | | | |
|---|---|---|---|
| 2,290,649 | 7/1942 | Macallum | 260—486 |
| 3,022,288 | 2/1962 | Miller | 260—233.3 |
| 3,082,245 | 3/1963 | Miller | 260—486 |
| 3,093,680 | 6/1963 | Miller | 260—486 |
| 3,100,794 | 8/1963 | Miller | 260—486 |

DONALL H. SYLVESTER, *Primary Examiner.*

MORRIS O. WOLK, *Examiner.*